June 2, 1953 — R. J. HARKENRIDER — 2,640,741
JOURNAL LUBRICATOR
Filed Aug. 11, 1949 — 4 Sheets-Sheet 1

Inventor
Robert J. Harkenrider

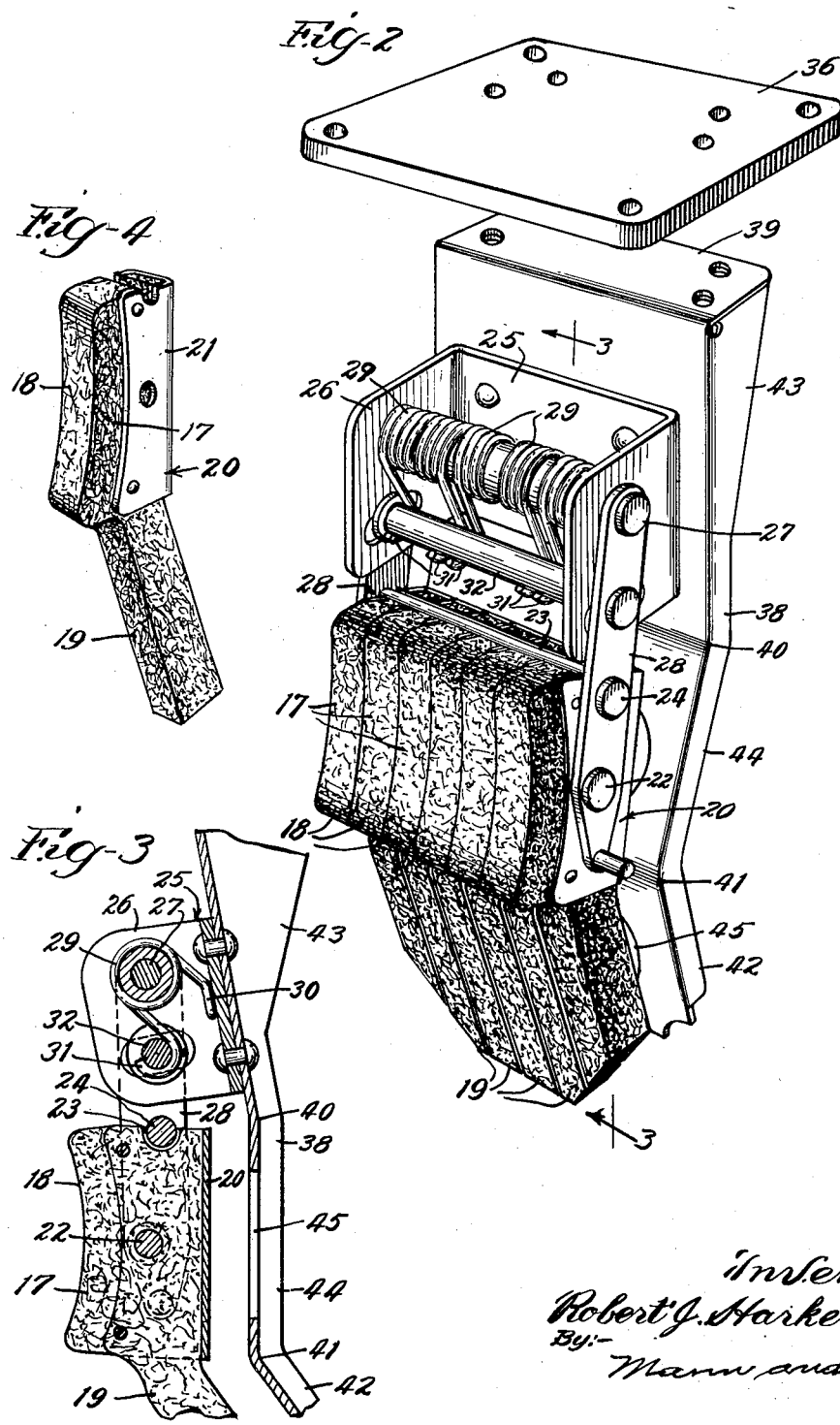

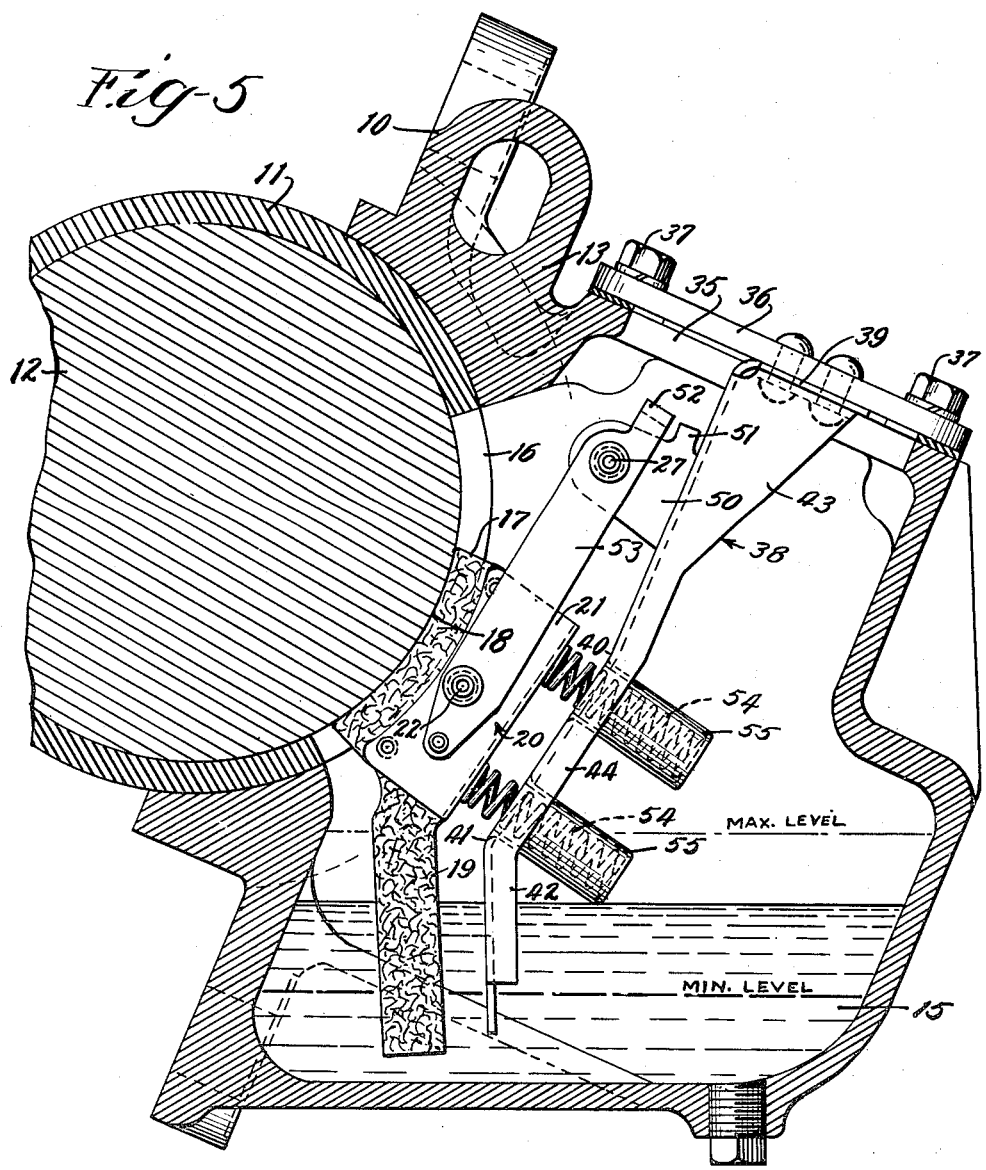

June 2, 1953  R. J. HARKENRIDER  2,640,741
JOURNAL LUBRICATOR
Filed Aug. 11, 1949  4 Sheets-Sheet 4
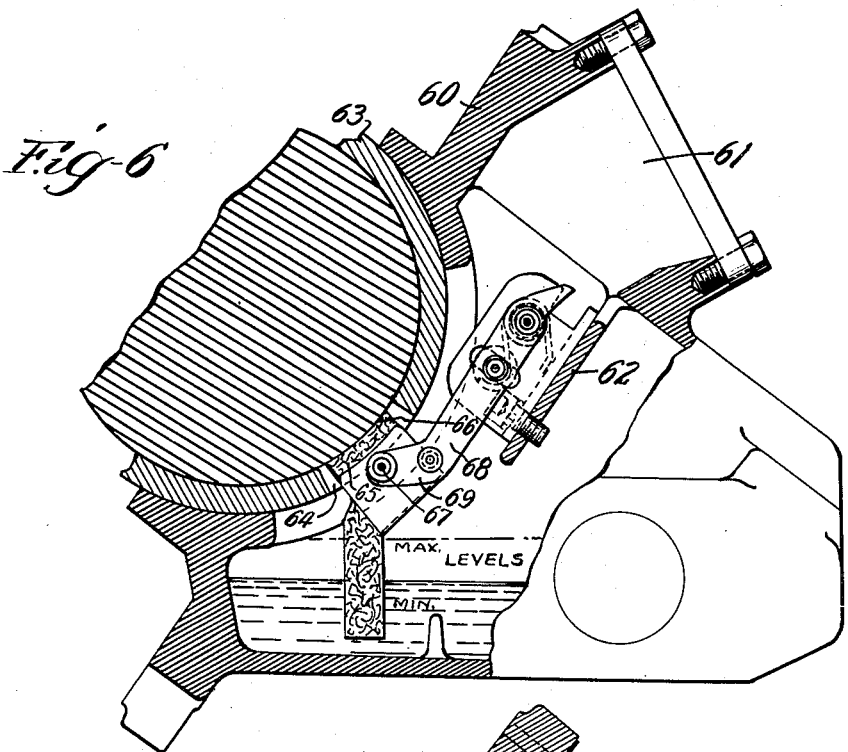
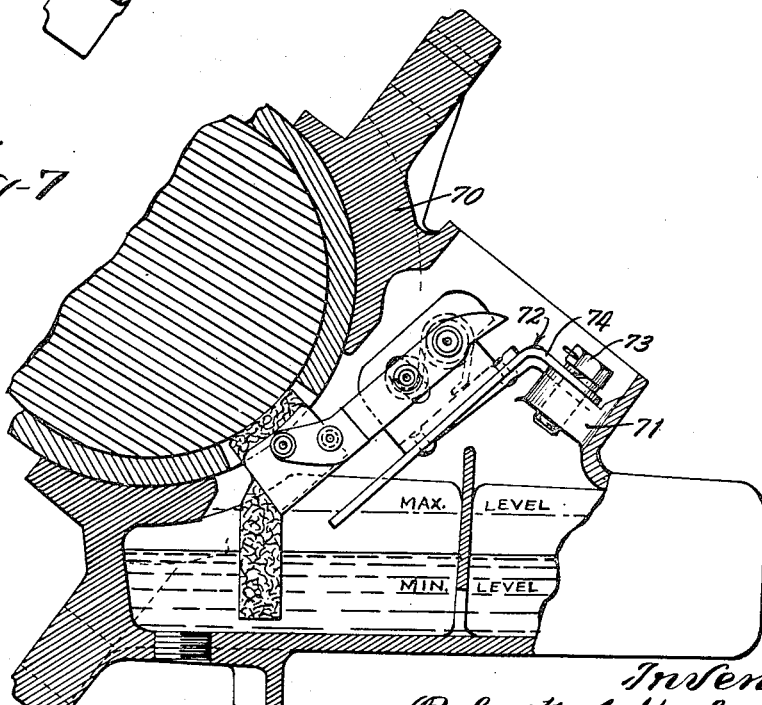
Inventor
Robert J. Harkenrider
By:- Mann and Brown
Attys Patented June 2, 1953

2,640,741

UNITED STATES PATENT OFFICE 2,640,741

JOURNAL LUBRICATOR

Robert J. Harkenrider, Winona, Minn., assignor to Gladys D. Miller, Winona, Minn.

Continuation of application Serial No. 43,579, August 11, 1948. This application August 11, 1949, Serial No. 109,750

14 Claims. (Cl. 308—132)

This invention relates to lubricators, particularly for suspension bearings for traction motors of diesel locomotives used in high-speed train service. Those locomotives are powered by diesel engines connected to an electric generator, which furnishes current to operate electric traction motors geared to the truck axles of the driving wheels and suspended from them. The motor suspension bearings are subjected not only to the transmission of enormous driving power but to terrific vibration of the axles caused by the wheels passing over irregularities of the track, and ample lubrication is a necessity that has been difficult to supply and maintain.

The motor suspension bearings usually include a detachable axle cap having an oil chamber or reservoir, and means intended to conduct that oil to and apply it to the axle journal.

This invention relates to an improved means for that purpose, and has for its object to provide an appliance, including a group of felts, that will raise a copious supply of oil and apply it to the axle evenly and in the places best suited to the direction of rotation that will compress and expand with vibrations of the axle, ejecting oil at each compression and absorbing oil with each expansion, and that will apply greater pressure on the axle adjacent to the leading end of the felts and less at the trailing end; and to provide a lubricator assembly that can be installed and removed with the inspection cover plate for the axle cap.

Further objects and advantages of the invention will appear as the disclosure proceeds and the description is read in connection with the accompanying drawings.

Fig. 2 is a perspective view of the lubricator appliance and associated baffle and cover plate;

Fig. 3 is a vertical section taken on the line 3—3 of Fig. 2;

Fig. 4 is a perspective view of an individual felt applicator forming a part of the group shown in Fig. 2;

Fig. 5 is a transverse vertical section similar to Fig. 1, showing an alternative form of lubricator appliance mounting; and Figs. 6 and 7 are transverse vertical sections corresponding to Figs. 1 and 5, and showing other arrangements suitable for different axle caps.

Figure 1:
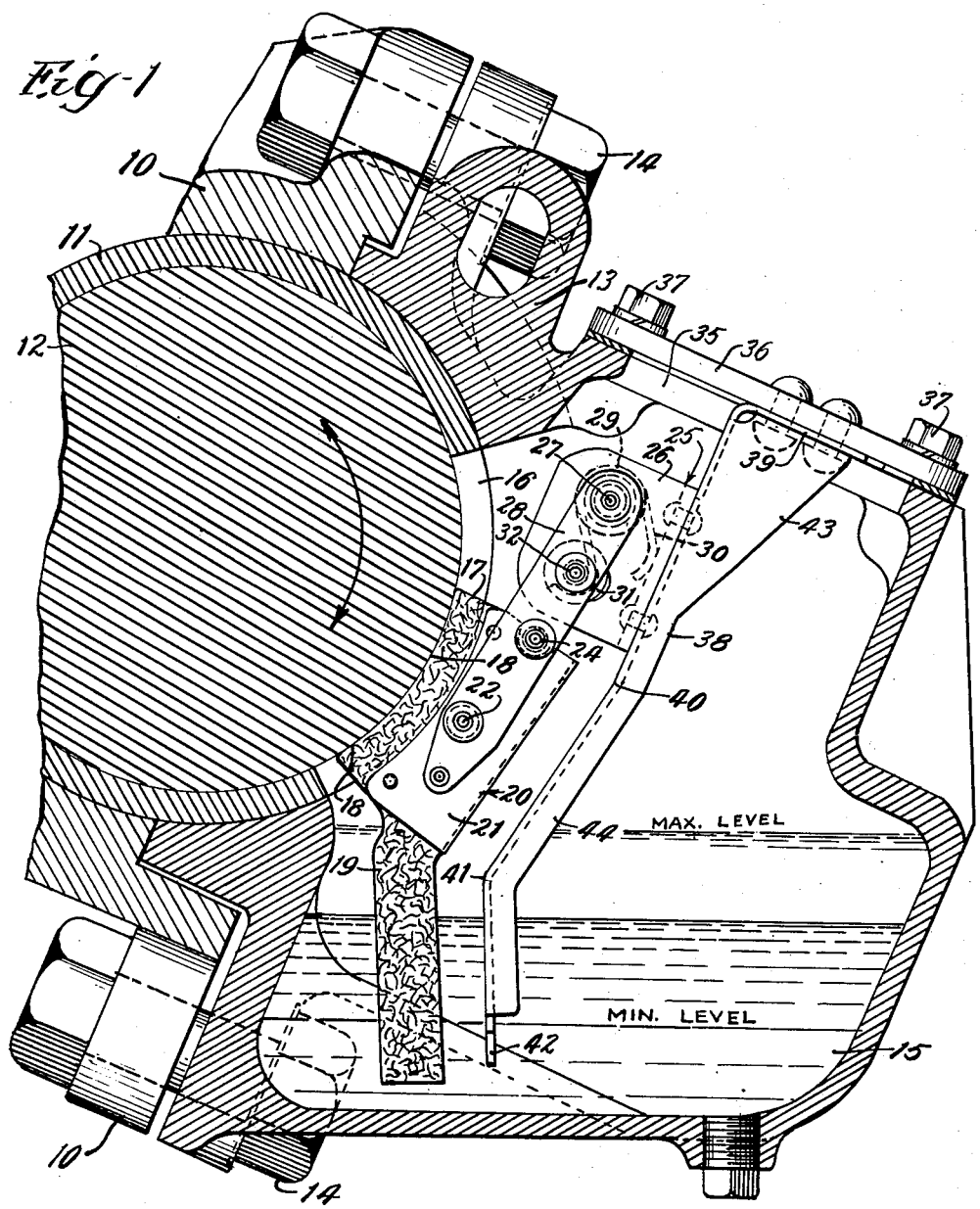
Fig. 1 is a transverse vertical section through a motor suspension bearing and the axle to which it is applied.

In Fig. 1 the reference numeral 10 indicates a familiar form of motor suspension bearing provided with a liner or shell 11 for the wheeled axle 12. Associated with these is a motor suspension bearing cap or axle cap 13, secured to the motor suspension bearing by bolts 14 and provided with an oil reservoir 15.

The means forming the subject-matter of this invention is to lift oil from the reservoir 15 and apply it to the axle 12 through the window opening 16 in the shell or liner 11.

That function is performed by a group of felts, each of which includes a pad 17 having a curved surface 18 to bear on the axle 12, and a wick section 19 adapted to extend down into the supply of oil in the reservoir 15 and continually deliver to the pad section 17 by capillary attraction.

Each felt is equipped with a U-shaped holder 20, the side flanges of which grip and confine the pad 17 to within a short distance from the surface 18 which runs against the axle.

It is commercially difficult to make a felt pad having sufficient surface area, corresponding to 18, with the fibers substantially endwise, to fit evenly against the axle journal and feed evenly to the surface of the axle in use. For that reason the applicator is made of a group of felts, each including the pad portion 17, each of which is confined laterally by the flanges 21 of the holders 20 to prevent them from spreading unduly by lateral expansion but allowing them to spread enough adjacent to the actual contact surfaces 18 to make the whole surface substantially complete and to provide material enough to stand the wear for a suitable period of service. It has been found that felts on the order of ¾" to $\frac{15}{16}$" thick are about the most satisfactory, and that the exposed area beyond the flanges 21 of ½" to ⅝" will insure a long period of service while reducing the lateral spreading beyond an objectionable amount and providing for enough spreading to make the contact surface of the whole complete and substantially uniform. That provides a surface that will wear about $\frac{1}{16}$" for 100,000 miles of travel, assuming the surface of the journal to be as smooth as it should be in practice.

It is important to have the felts automatically set against the journal and automatically conform to the surface, irrespective of accumulation of tolerances. To accomplish that each felt and each mounting is pivoted—in this instance on a rod 22 parallel to the journal 12 and substantially equidistantly spaced from the ends of the surfaces 18 intended to bear on the journal. With such an arrangement, and yielding pressure applied to the group of pads, there is a natural tendency for the applicators to conform to the surface to be lubricated. In addition, there is a tendency for the pad to rotate slightly in the opposite direction to the journal, due to the tendency of the felt to adhere to the journal as it revolves. That tendency is predominant at the end portion of the felt first presented to the rotating journal, which may be called the leading portion or leading edge. The result of that tendency is an increase in pressure between the pad and the journal over a considerable area on one side of the rod 22. There is also a relief of pressure in a corresponding area at the opposite side of the rod 22. Where the pressure is increased there is a surplus of oil ejected or pushed out, and where pressure is decreased that surplus is not wiped off as completely as if there was no pivotal movement allowed. The net result is a greater application of oil to the surface of the journal and a greater proportion left on the surface of the journal that can be had without the pivoting, and careful observation indicates that a lower working temperature results.

The optimum condition for any particular installation will depend upon considerations growing out of it. As a general rule the proportions will be gotten approximately by placing the axis of the rod 22 on a radius from the axis of the journal 12 a distance from the surface 18 related to the length of that surface that will produce the desirable tendency to rotate for the purpose indicated, but will not produce excessive pressures at the leading edge. A ratio of 1 for the shortest line between the axis of the rod 22 and the surface 18 to 3 to 3½ for the length of the surface 18 has been found satisfactory. How far on each side of those limits it would be possible to go depends on the particular material that is involved and other conditions, but a reasonable amount of cut and try will give the answer.

As a rule it will be found desirable to limit the rotation about the rod 22. This is conveniently accomplished by providing the flanges 21 of the holders 20 and the pads with a notch or a groove 23 and inserting a limiting rod 24, substantially as shown in Fig. 3. The amount of movement about the rod 22 will necessarily vary with the proportion of things, but no difficulty will be experienced in arriving at the proper limit.

It is eminently desirable to have the felts yieldingly pressed against the journal. When a locomotive is operating at high speed, on the order of 90 to 100 miles an hour, there is terrific vibration of the axles, due to irregularities in the track. That vibration, while presenting a problem, also is tuned to advantage in lubrication with the present invention, for each vibration effects a momentary compression of the felt followed by a momentary relaxation resulting in expansion. Each compression ejects oil from the pad, and each expansion makes it act like a sponge.

For many installations the yielding pressure on the pads is best furnished by mounting them to swing toward the journal in response to spring pressure. In Figs. 1, 2 and 3 the lubricating appliance includes a U-shaped base 25 having substantially parallel flanges 26 receiving a pivot pin 27 for levers 28, through which the rods 22 and 24 extend and by which the pads are mounted to swing toward and away from the journal. They are yieldingly urged toward the journal by torsion springs 29 having their intermediate portions 30 resting against the base 25, their end portions hooked about a rod 32 extending through the levers 28 and the main portion of the springs coiled about the pivot pin and rod 27. As here shown, three such springs are used, and each amounts to a pair of springs in that each half has a portion of the part 30 and a portion of the part 31 and the winding about the pivot pin 27. Hence a break of either section of the spring leaves the other in operative condition.

The amount of pressure between the pads and the journal at rest will necessarily vary with the conditions. As an example, a lubricator designed for a high-speed passenger diesel, say, of 95 to 100 miles per hour, may have a static wick pressure of approximately one-half pound per square inch. In a lubricator designed for a freight locomotive with a maximum speed of 60 miles per hour, the wick pressure may be in the neighborhood of three-quarters to one pound per square inch.

The axle cap or motor suspension bearing cap 13 is provided with an inspection opening 35 normally closed by a cover plate 36 secured by bolts 37. The removal of that plate permits inspection of the reservoir 15 and the parts therein, and gives access to the lubricator appliance. In has been found of great advantage to mount the lubricator appliance on the cover plate 36, to the end that they may be installed and removed by the same operation, and to the end that by merely installing the cover plate and securing it the lubricator appliance will automatically adjust itself in position with respect to the journal and the reservoir.

Where the construction of the axle cap will permit, this is advantageously accomplished by securing a mounting plate 38 to the cover plate 36 and securing the base 25 of the lubricator appliance to the mounting plate. In Figs. 1, 2 and 3 the mounting plate 38 takes the form of an oil baffle extending down into the reservoir. At its upper end it is provided with a flange 39 riveted or bolted to the cover plate 36. At an intermediate portion 40 it is bent slightly toward the journal, and again at 41 it is bent in the opposite direction, terminating in a downwardly directed portion 42. The sides of the mounting plate are turned at right angles, and provide gussets 43 and flanges 44. Suitable openings 45 in the mounting plate allow the oil to go through while being restrained from over-violence.

With this arrangement the parts shown in Fig. 2 form a commercial assembly normally stocked at appropriate engine houses where locomotives are to be serviced at any time, such as after 100,000 to 150,000 miles when the wheel flanges may need turning and, hence, the axle must be removed. The entire assembly of Fig. 2 may be removed and replaced by another assembly with the pads already saturated and otherwise prepared for use. The assembly that has been removed can then be given the appropriate service and put back in stock. Where the wear on the pads has approached ¾" to ⅝", or the flanges 21 are getting too close to the journal, the assembly will be provided with a new group of felts and holders.

In the form shown in Fig. 5, the construction and arrangement is substantially the same as in Figs. 1, 2, 3 and 4. The base 50 for the lubricator appliance, while retaining its U-shaped character to receive the pivot pin 27, is provided with projections 51 cooperating with limit lugs 52 on the levers 53 in which the holders 20 and pads 17 are pivotally mounted on the rod 22.

The torsion springs 29 are replaced by helical springs 54 seated in barrels 55 carried by the mounting plate 38, and bearing against the bases of the holders 20. The operation of this form is much the same as in the preceding. However, the helical springs 54 lend a smoothness to the tilting or rocking of the felts as the speed of the journal varies. They allow appropriate rocking without a positive stop, except at extreme movement; and they allow the difference in pressure between the opposite ends of the surface in contact with the journal to automatically adjust with the speed.

It has been found a satisfactory arrangement to have the axes of the springs 54 spaced approximately equal to one-half the length of the surface of the pad to contact with the journal and at either side of the rod 22.

The appliance shown in Fig. 6 is adapted to axle caps 60 having relatively small inspection openings 61 and baffles 62. Such caps are usually associated with shells or liners 63 having narrow windows 64. The appliance in this instance includes a group of felts 65, such as 17, but having much shorter curved surfaces 66 for contact with the journal. Hence, in order to get the axis of the pivot rod 67 closer to the surface 66, the supporting levers 68 have angular portions 69 receiving the pivot rods 67. A ratio of the shortest line between the axis of the pivot and the surface of the felt of 1 to 2½ for the length of the surface has been found satisfactory.

The form shown in Fig. 7 is also adapted for use with axle caps having small inspection openings and associated with small windows in the shell or liner. The cap 70 is shown provided with a flange 71 to which a mounting plate 72 is made fast by bolts 73 passing through an angular base portion 74. Otherwise the construction and arrangement corresponds approximately to that shown in Fig. 6.

The operation of the lubricating appliances in these two forms is comparable to that in the two previous forms, although, on account of the smaller surfaces, smaller windows, and so forth, the operation is in detail appropriately different.

The variation in the embodiments has been made to suit actual conditions due to variations in traction motor suspensions produced by different locomotive makers.

In all of them there is a desirable tendency of the pads to rotate opposite to the journal, producing increased compression in the leading edge and decreased compression at the trailing edge which varies with the speed and in starting and stopping. It also necessarily varies with the vibration and combines, with the vibration, to assist in exuding or ejecting the oil from the pad on the journal and preventing the ejected oil from being too greatly wiped off.

In all the forms the holders permit the expansion of the pads laterally enough to provide substantially uniform contact with the journal, but prevent such expansion as would spread the applicator beyond desirable limits. Throughout all the useful service the flanges on the holders are well spaced from the journals so as to prevent metal-to-metal contact in the main, and to permit the varying compression and expansion described. Preferably the felt projects ½" beyond the flanges of the holder, and, in some instances, it has been found appropriate to provide a ⅝" projection. In all the forms limit stops are used.

This application is a continuation of my application Serial No. 43,579, filed August 11, 1948, and disclosing some additional embodiments.

I claim:

1. In a device of the class described, an axle cap having an oil reservoir in its lower portion and an opening above the reservoir, a cover plate removably closing the opening, and a yieldingly mounted journal lubricator carried by the cover plate whereby both the cover plate and the lubricator may be installed or removed by the same operation.

2. In a device of the class described, an axle cap having an oil reservoir in its lower portion and an opening above the reservoir, a cover plate removably closing the opening, a baffle mounting plate carried by the cover plate, and a journal lubricator mounted on the baffle mounting plate whereby the baffle mounting plate and lubricator form an assembly for installation and removal as a unit.

3. In a device of the class described, an axle cap having an oil reservoir in its lower portion and an opening above the reservoir, a cover plate removably closing the opening, a baffle plate fixed to the cover plate, and a journal lubricator carried by the baffle plate and including a yieldingly mounted pad whereby installing the cover plate will bring the lubricator into operating position.

4. In a lubricator for a journal provided with an axle cap having an oil reservoir in its lower portion and an opening above the reservoir, a cover plate removably closing the opening, a baffle plate fixed to the cover plate, a journal lubricator carried by the baffle plate and including a pivotally mounted pad, and yielding means adapted to urge the pad laterally toward a journal in the axle cap whereby installing the cover plate with the baffle plate fixed thereto will bring the lubricator into operating position.

5. In a journal lubricator, a lubricating pad having leading and trailing edges defining between them a curved surface for contact with a journal, a holder for the pad having side pieces to confine the pad laterally but spaced from said curved surface, resilient means operatively connected to the holder and adapted to urge the pad against the journal, means pivoting the pad and holder about an axis between said leading and trailing edges and adapted to be disposed parallel to the journal axis, and means limiting the pivotal movement of the pad and holder.

6. In a journal lubricator, a lubricating pad having leading and trailing edges defining between them a curved surface for contact with a journal, a holder for the pad having side pieces to confine the pad laterally but spaced from said curved surface, spaced pivotally mounted levers, a pivot for the holder extending axially between the levers and lying between said edges and parallel thereto and adapted to be disposed parallel to the journal axis, limit means on the levers limiting the movement of the holder about the pivot, and resilient means adapted to urge the levers and the pad toward the journal to be lubricated.

7. In a journal lubricator, a lubricating pad having leading and trailing edges defining between them a curved surface for contact with a journal, a holder for the pad having side pieces to confine the pad laterally but spaced from said curved surface, spaced pivotally mounted levers, a pivot for the holder extending axially between the levers and having its axis lying between said edges and parallel thereto and adapted to be disposed parallel to the journal axis, limit means on the levers limiting the movement of the holder about the pivot, and resilient means adapted to urge the levers and the pad toward the journal to be lubricated.

8. In a journal lubricator, a felt pad having leading and trailing edges defining between them a curved surface for contact with a journal, a holder for the pad having side flanges to confine the pad laterally but stopping short of the curved surface, yielding means adapted to press said curved surface of the pad against the journal, and means pivoting the holder to swing about an axis parallel to and between said leading and trailing edges and so remote from the curved surface of the pad that drag imposed thereon by the journal to which the pad is adapted to be applied will make the pressure on the leading edge of the pad exceed substantially that of the trailing edge, whereby the holder will swing about its pivoting means and the leading edge of the pad will be compressed more than the trailing edge thereof.

9. In a lubricator for a journal provided with an axle cap having an oil reservoir in its lower portion and an opening above the reservoir, a cover plate removably closing the opening, a lubricator support mounted on the cover plate, a resilient carrier on the support, a pad holder pivoted to the carrier to rotate about an axis adapted to be disposed parallel to that of the journal to be lubricated, and a pad projecting from the carrier for yielding contact with the journal.

10. In a device of the class described, a journal bearing attachment having an oil reservoir in its lower portion and an opening above the reservoir, a cover plate removably closing the opening, a lubricator support mounted on the cover plate, spaced levers pivotally mounted on the support, resilient means urging the levers toward a journal in said attachment, a pad holder pivoted between the levers, and a felt pad confined laterally by the holder and projecting from it and bearing on the journal.

11. In a device of the class described, a journal bearing attachment having an oil reservoir in its lower portion and an opening above the reservoir, a cover plate removably closing the opening, a lubricator support carried by the cover plate, and a lubricator carried by the support including a base, spaced levers pivoted to the base and spring pressed toward a journal in said attachment, a pad holder pivoted between the levers, and a felt pad confined laterally by the holder and projecting beyond it into contact with the journal.

12. In a lubricator, spaced side pieces, yielding means urging the side pieces in one direction, a pad holder pivoted between the side pieces, a felt pad carried by the pad holder, and means operatively connected to the side pieces and the holder limiting the range of pivotal movement of the holder on the side pieces.

13. In a lubricator, spaced side pieces, yielding means urging the side pieces in one direction, a pad holder pivoted between the side pieces and having a slot, a pad carried by the pad holder, and a limit pin carried by the side pieces and positioned in the slot whereby working of said pin in the slot limits the range of pivotal movement of the holder on the side pieces.

14. In a device of the class described, an axle cap having an oil reservoir in its lower portion and having an opening therein, a cover plate removably closing said opening, and a yieldingly mounted journal lubricator carried by the cover plate having an oil-applying pad and a wick depending therefrom into said reservoir, whereby both the cover plate and the lubricator may be installed or removed simultaneously at a unit.

ROBERT J. HARKENRIDER.

References Cited in the file of this patent

UNITED STATES PATENTS

| Number | Name | Date |
|---|---|---|
| 279,506 | Sweeney | June 12, 1883 |
| 334,013 | Gibbons | Jan. 12, 1886 |
| 439,207 | Stever | Oct. 28, 1890 |
| 2,021,715 | Cooper | Nov. 19, 1935 |
| 2,095,257 | Kendall | Oct. 12, 1937 |
| 2,427,701 | Ballard | Sept. 23, 1947 |
| 2,540,829 | Miller | Feb. 6, 1951 |